United States Patent [19]
Steinrück et al.

[11] Patent Number: 6,155,534
[45] Date of Patent: Dec. 5, 2000

[54] GAS VALVE WITH ELECTROMAGNETIC ACTUATION

[75] Inventors: Peter Steinrück, Hallstadt; Karl Rein, Vienna; Josef Horvath, Nebersdorf, all of Austria

[73] Assignee: Hoerbiger Ventilwerke GmbH, Vienna, Austria

[21] Appl. No.: 09/256,759

[22] Filed: Feb. 24, 1999

[30]     Foreign Application Priority Data

Feb. 24, 1998  [AT]  Austria ........................................ 334/98
Feb. 24, 1998  [AT]  Austria ........................................ 335/98

[51] Int. Cl.$^7$ ................................................. F16K 31/02
[52] U.S. Cl. ............................... 251/129.18; 251/129.16
[58] Field of Search ....................... 251/129.01, 129.15, 251/129.16, 129.18

[56]     References Cited

U.S. PATENT DOCUMENTS

| | | | |
|---|---|---|---|
| 5,424,704 | 6/1995 | Dolle | 251/129.18 X |
| 5,586,747 | 12/1996 | Bennardo et al. | 251/129.18 |
| 5,804,962 | 9/1998 | Kather et al. | 251/129.18 X |

*Primary Examiner*—Kevin Lee
*Attorney, Agent, or Firm*—Dykema Gossett

[57]     ABSTRACT

A gas valve with electromagnetic actuation, in particular for use as a fuel injection valve for gas engines, is provided with a sealing element (7), actuable by way of an armature (12) of a controllable electromagnet (19), between a or each fuel inlet (4) and a or each fuel outlet (24), and at least one closing spring (8) acting on the sealing element (7). In order to obtain an opening cross-section which can be simply and rapidly calibrated and adjusted in a certain range, an element (1, 2, 18) is present for adjusting the distance between the electromagnet (19) and the armature (12).

15 Claims, 3 Drawing Sheets

GAS VALVE WITH ELECTROMAGNETIC ACTUATION

BACKGROUND OF THE INVENTION

1. Field of the Invention

The present invention relates to a gas valve with electromagnetic actuation, in particular to a fuel injection valve for gas engines, which includes a sealing element, actuable by way of an armature of a controllable electromagnet, between a or each fuel inlet and a or each fuel outlet, and at least one closing spring acting on the sealing element.

2. The Prior Art

In conventional gas engines based on the Otto principle, the fuel gas is admixed in the intake port and then supplied to the cylinders. Control valves and static mixers, for example, are used in this procedure. However, these systems are too unwieldy for systems with electronic fuel injection. Gas nozzles switched by way of magnets have therefore been used, these nozzles metering the fuel and producing a combustible mixture in the entire supply system. On account of the fact that the passage cross-sections are too small in conventional gas valves for use in commercial vehicles, it is necessary to bundle these gas valves, typically up to twelve of them, to obtain sufficient cross-sections (corresponding to the central injection which is customary in passenger vehicles). For this reason, gas engines, for example CNG (compressed natural gas), LPG (liquefied petroleum gas) or hydrogen engines, should also only be operated at present without supercharging, that is to say at atmospheric pressure, and typically achieve about 145 kW. However, for improved controllability, better fuel utilization and more favorable pollutant emissions, preference is given to systems which operate with so-called sequential fuel injection (also known as multi-point injection or ported-gas admission) and supply each cylinder individually with its combustible mixture by way of separate injectors or valves. In this case, it is not necessary for a combustible mixture to be present in the entire intake system, and the fuel injection mainly takes place during the intake cycle of the respective cylinder only. However, the valves known at present are unsuitable for use in such systems, since their passage cross-sections of not more than 4 to 5 mm² are too small, so that, per cylinder, two valves would be needed in atmospheric engines and three valves in supercharged engines. However, this is scarcely possible for structural reasons. On the other hand, the requirement for a larger passage cross-section entails ever-greater difficulties as regards obtaining the required short switching times and the high metering precision necessary, resulting in a low average pressure especially in the idle range and part-load range.

It is an object of the present invention to provide a gas valve—in an advantageous embodiment having very short switching and response times and at the same time a large passage cross-section, especially for use in multi-point systems and in supercharged engines, in particular in gas engines for commercial vehicles—which is notable for an opening cross-section which can be simply and rapidly calibrated and adjusted in a certain range.

SUMMARY OF THE INVENTION

The invention provides a gas valve with electromagnetic actuation including at least one fuel inlet, at least one fuel outlet, a housing for receiving an electromagnet, a valve housing, a sealing element actuable by way of an armature of a controllable electromagnet between the or each fuel inlet and the or each fuel outlet, at least one closing spring acting on the sealing element and at least one adjusting element for adjusting the distance between the electromagnet and the armature. The clearance between the electromagnet and the armature is rapidly and precisely adjustable retrospectively and/or from outside, without complicated dismantling of the valve, so that the opening cross-section of the valve can be simply and quickly adapted.

According to one embodiment of the invention, the at least one adjusting element operates in the closed state of the valve, that is to say the valve lift. In many types of valves, the opening cross-section is directly proportional to the lift of the sealing element, that is to say the valve lift, so that its precise adjustment and calibration capability is essential for the precise adjustment and checking of the metering precision of the valve.

According to a preferred embodiment of the invention, a housing receiving the electromagnet is constructed as a magnetic clamping nut provided with a thread and is adjustably screwed onto a thread of the actual valve housing. This enables the simple and rapid adjustment and calibration of the gas valve from outside, without having to open the valve or to act on internal parts by way of complicated adjusting mechanisms.

However, the object of the invention may also be achieved in that the armature is designed as a substantially plane armature plate which is arranged, by way of a spacer element which is adjustable where appropriate, with a clearance with respect to the electromagnet, even in the open position of the valve. High magnetic forces can thus be produced by way of the plane and relatively large-area armature plate. Nevertheless, these high forces, which are necessary for the rapid valve actuation and short control times, cannot lead to damage of the very soft armature plate and the very soft components of the electromagnet, on account of the clearance which is always present.

In order to obtain high metering precision even in the case of prolonged operation and different operating states, there is provision for the spacer element to be a spacer ring which surrounds the armature plate, which is made from temperature-resistant and highly dimensionally-stable material and is held in a constant position with respect to the electromagnet by way of at least one spring element.

Advantageously, the spacer element or the spacer ring consists of plastic material filled with mineral materials, carbon fibers or glass fibers, preferably of PPS, PEEK, PEI or PPA. These materials are particularly well suited to the production of a spacer element on account of their high dimensional stability and temperature resistance.

If, according to a preferred feature of the invention, the spacer ring is provided on its inside with a bent-off portion, against which bears a projection of the armature plate or a stop plate connected thereto and preferably made from different material in the open state of the valve, it is thus possible to reliably ensure a clearance between the electromagnet and the armature plate which is maintained in each operating state and at all times and prevents damage to these components even in the case of a prolonged operating duration.

In order to ensure sufficient mechanical strength for reliable maintenance of the clearance between the armature plate and the electromagnet, which prevents a deflection of the armature plate, and at the same time does not adversely affect the magnetic conditions in the valve, the stop plate consists of precipitation-hardening chromium steel.

In order to obtain particularly high valve cross-sections even for very small control times, so that the valve cross-sections can be adjusted and calibrated in the manner described above, there is advantageously provision for the gas valve to be designed as a flat-seat valve with a plane valve seat and a sealing element with at least one plane sealing surface facing this valve seat. This design allows reliable and sure switching of high valve cross-sections along with very small switching times, so that even at idle speed or part load such a gas valve can obtain the necessary control times of less than 1 ms with high precision, it being possible to adjust and calibrate this separately for each valve in the system. Such valves are particularly advantageous for use in gas engines for commercial vehicles.

Three embodiments of the invention will now be described with reference to the accompanying drawings.

DETAILED DESCRIPTION OF THE PREFERRED EMBODIMENTS

There are no limitations on the valve construction chosen here by way of example as a flat-seat valve and/or the special design of electromagnet and armature.

Figure 1:
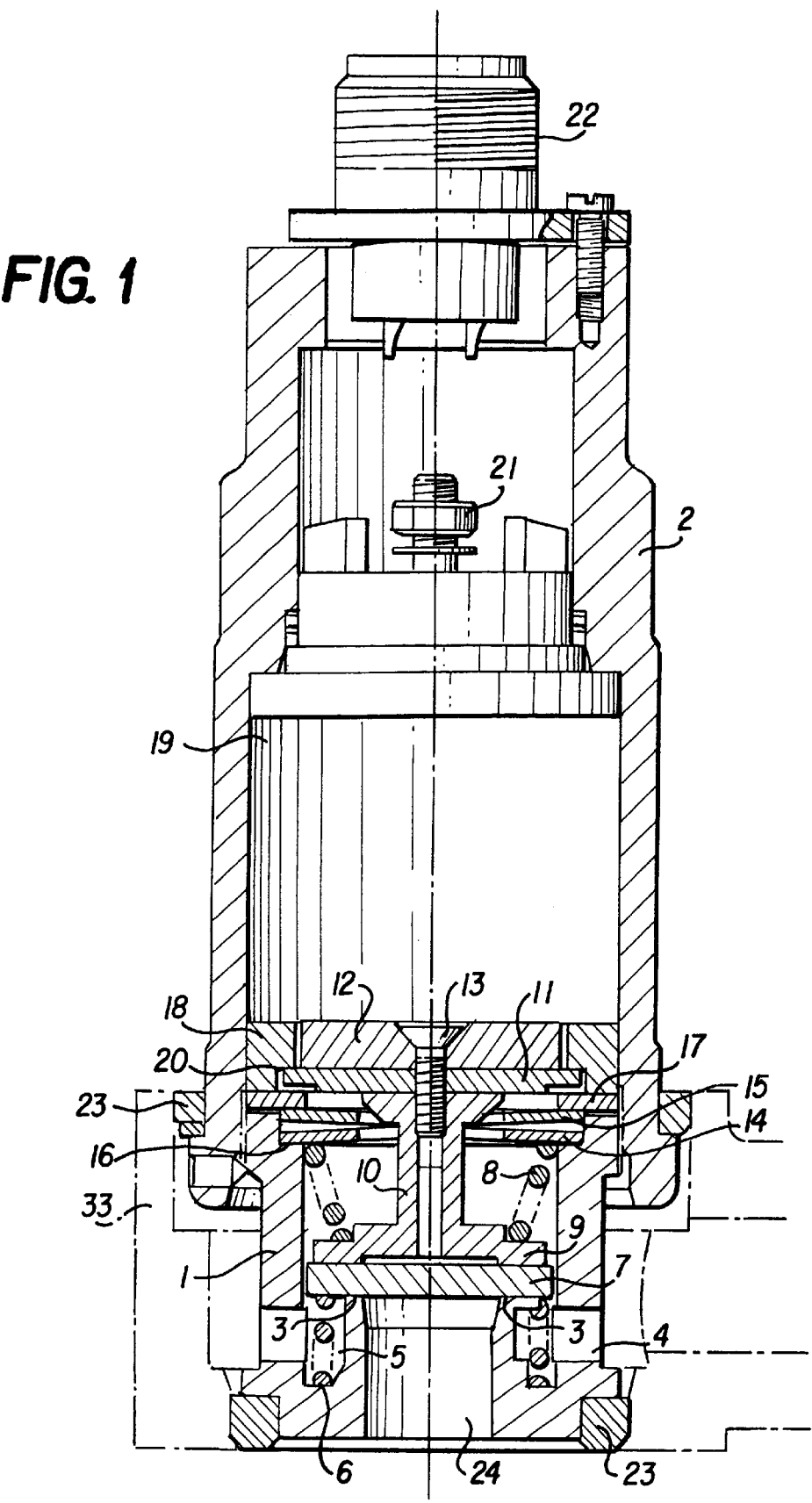
FIG. 1 shows a first preferred embodiment of a gas valve of relatively small valve cross-section with a single sealing strip.

FIG. 1 shows a valve cross-section which is large and at the same time can be quickly switched. A flat-seat gas valve comprises a valve body 1 and a magnetic clamping nut 2 which is screwed onto an external thread of this valve body 1. The valve body 1 contains the valve seat 3, which in this case is a simple plane sealing strip of substantially circular design. The gaseous fuel or the combustible mixture, for example compressed natural gas, liquefied petroleum gas or hydrogen, enters an annular space 5 in the valve body 1 through the preferably radial fuel inlets 4, although other points of entry or directions of entry are also possible. For instance, the gaseous fuel or the combustible mixture could also enter the valve body 1 through at least one axial channel which may, for example, also run through or to the side of the magnetic clamping nut.

At least one opening spring 6, preferably designed as a helical spring, urges the sealing element 7, preferably made from plastic, with a force in the valve-opening direction. The opening spring 6 is also inserted in the annular space 5, which serves to even out the gas flow in order to improve the passage through the valve. However, this opening spring 6 is not a component which is absolutely essential.

The annular space 5 is preferably arranged below the sealing strip 3 and the sealing element 7, but an evening-out space above these parts is also conceivable. In either case, this space prevents an adverse effect on the flow through the freed valve cross-section due to flow phenomena, so that there is always an optimal flow through the entire opening cross-section and the maximum-possible amount of gas can pass through the valve.

At least one stronger closing spring 8 acts on the sealing element 7 from the opposite side to the opening spring 6. The closing spring 8 is preferably a helical spring which is tapered towards the sealing element 7. However, the closing spring 8 does not act directly on the sealing element 7, but rather on a widened, substantially disc-shaped end part 9 of an actuating element 10. The actuating element 10 is preferably surrounded by the closing spring 8. The end part 9 prevents deformations of the sealing element 7, which could be caused, for example, by the radially mutually offset lines of action of the opening spring 6 and the closing spring 8. These deformations adversely affect the leaktightness of the valve. The taper of the closing spring 8 not only performs the closing function but at the same time also centers the actuating element 10 and thus also the sealing element 7 above the valve seat.

The opening spring 6 or the entire opening spring arrangement is advantageously weaker than the closing spring 8 or the entire closing spring arrangement to such a degree that the difference between the forces of the closing and opening spring is equal, in terms of quantity, to the difference between the forces of the electromagnet and spring arrangement.

Of course, any other form of sealing element and actuating arrangement is possible, with differences in the achievable valve cross-section and/or the control times, for example a sealing element in the form of a needle, slide or sphere, which can be controlled by way of, in principle, any type of actuating arrangement, for instance by way of push rods or plungers fixedly connected to the sealing element, by way of systems of one or more parts, or lever arrangements, etc could be used as an alternative. It would also be possible, to have a metallic sealing element itself as the armature of the electromagnet given an appropriate low-wear design of the valve seat.

In the present case, there is no connection capable of being subjected to tension between the sealing element 7 and the actuating element 10, so that the opening spring 6 is absolutely essential to lift the sealing element 7 off from the sealing strip 3 and open the valve. In order then to ensure sufficient strength and also dimensional stability of the actuating element 10 and also of the widened end part 9, these parts are preferably made from metal. On the other hand, to keep the wear on the sealing strip 3 low, the sealing element 7 is to be made not from metal but from plastic. It is difficult, however, to produce a durable steel-plastic connection capable of being subjected to alternating stresses. It is of course advantageous for there to be at least assistance of the opening operation of the valve in the other types of valves mentioned as well, even if there is a tension-resistant connection of the armature and sealing element.

The actuating element 10 is preferably connected to the armature plate 12, made from magnetizable, relatively soft metal, with interposition of a stop plate 11, by way of the screw 13. The stop plate 11 is made from a non-magnetizable or only slightly magnetizable, but considerably harder material than the armature plate 12, preferably from precipitation-hardening chromium steel.

The closing spring 8 is supported on the side located opposite the end part 9 by way of two mutually convexly facing disc springs 14, 15, the disc spring 14 which is in contact with the closing spring 8 resting on a bent-off portion 16 of the inner wall of the valve body 1 and thus constituting a substantially stationary support for the closing spring 8. The second disc spring 15 is supported by way of an intermediate disc 17 against a spacer ring 18, which, in turn, bears against the side of the electromagnet 19 facing the armature plate 12.

The spacer ring 18, which surrounds the armature plate 12 and the stop plate 11, is made from a material with high dimensional stability and temperature resistance, for instance through minimal water absorption, preferably from a plastic material filled with a high level of mineral materials, carbon fibres or glass fibers. Particularly preferred plastic materials for this application are polyphenylsiloxanes (PPS), but also polyether ether ketones (PEEK), polyether imides (PEI) and polyphthalamides (PPA). The spacer ring 18, which also guides the armature plate 12 with low friction, has a bent-off portion 20 which is directed towards the stop plate 11 and against which the stop plate 11, projecting radially beyond the armature plate 12, comes into abutment when the armature plate 12 is in its position nearest the electromagnet 19. The thickness of the spacer ring 18 from the underside of the electromagnet 19 to the bent-off portion is, however, always greater than the thickness of the armature plate 12 in this arrangement, so that even when the valve is fully open a clearance remains between the armature plate 12 and the electromagnet 19. Even if there are high forces and rapid movements of the system consisting of the armature plate 12, the stop plate 11, the actuating element 10 and the end part 9, the hard material of the stop plate 11 prevents a deformation of the armature plate 12 and thus prevents the armature plate 12 from abutting against the very soft material of the electromagnet 19.

The electromagnet 19, preferably a coil magnet with a three-legged yoke, controlled by way of the electronics of the injection system, is supplied with current by way of the threaded connection pin 21, the current being fed in by way of the plug 22. The force exerted by the electromagnet 19 is in the range from 200 to 300 N, in order to achieve the required short control times of less than 1 ms. So that the times for opening and closing the valve are substantially equal, the forces of the electromagnet 19, the closing spring 8 and the opening spring 6 are coordinated with one another in such a way that the difference between the forces of the electromagnet 19 and the arrangement of the opening spring 6 and the closing spring 8 is equal, in terms of quantity, to the difference between the forces of closing spring 8 and opening spring 6, so that forces of equal size are required for the opening and closing and thus, indirectly, equal accelerations act on the sealing element 7.

Seals 23 on the outside of the valve housing ensure the leaktight installation of the gas valve in the system, into which the fuel issuing from the valve or the issuing combustible mixture is injected by way of the fuel outlet 24.

By rotating the magnetic clamping nut 2, the distance between the electromagnet 19 fixedly held therein and the armature plate 12 can be adjusted, the armature plate 12 in the deenergized state of the electromagnet 19 normally being in its position with the greatest distance from the electromagnet 19, that is to say the closed position of the valve, owing to the action of the at least one closing spring 8 on the widened end part 9 of the actuating element 10. In the illustrated embodiment, the magnetic clamping nut 2 is the element for adjusting the distance between the electromagnet 19 and the armature 12, that is to say the valve lift. On the other hand, additional, separate adjusting elements, such as separate adjusting screws, adjustable intermediate rings or intermediate rings of different thickness, engageable adjusting connecting links or the like, are also possible. The valve lift and thus the directly proportional opening cross-section can thereby be precisely adjusted and calibrated. Typically, the valve lift will be in the range from about 0.15 to 0.3 mm and the opening cross-section in the range up to approximately 10 mm$^2$. The disc spring arrangement 14, 15 compensates for these changes in distance for the support position of the closing spring 8, so that the latter always substantially retains the same prestress and the valve characteristic therefore only changes insignificantly or not at all on adjustment of the valve lift.

Figure 2:
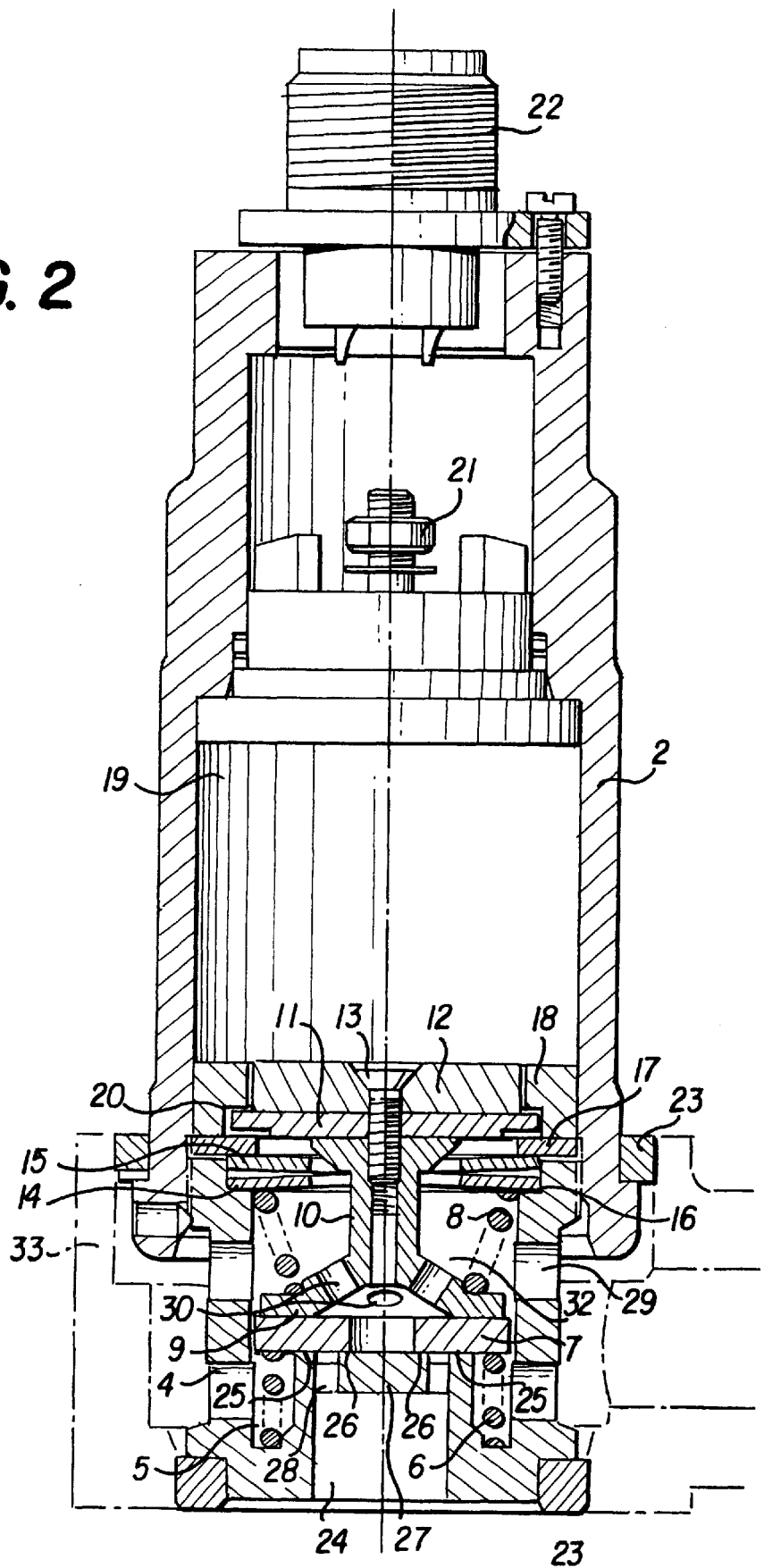
FIG. 2 shows a gas valve of larger valve cross-section with two sealing strips.

The embodiment of the gas valve in FIG. 2 differs from the embodiment in FIG. 1 in that there is a different design of the valve seat, which as a consequence also entails changes to the sealing element, the end piece of the plunger and the fuel inlet. The rest of the construction does not differ from the one described above.

The valve seat of the gas valve in FIG. 2 comprises two sealing strips 25, 26 which are both substantially plane and circular and are arranged in the same plane and substantially concentrically, preferably coaxially. The inner sealing strip 26 is formed on a disc 27 which is held on the part of the valve body 1 forming the outer sealing strip 25, by way of at least two, preferably three or more webs 28—see also FIG. 3 in this regard. In order not to affect the sealing action of the sealing element 7, the webs 28 do not reach the height of the sealing strips 25 and 26. To allow the fuel or the combustible mixture to flow through the valve by way of both sealing strips, gas passages to the inner sealing strip 26 are also provided. In the exemplary embodiment illustrated, these gas passages are formed by at least one additional, preferably likewise radial fuel inlet 29, openings 30 in the widened end part 9 of the actuating element 10 and at least one central cutout 31 in the thereby preferably annular sealing element 7. As an alternative to this, connecting channels or axial groove-shaped cutouts in the inner wall of the valve body 1 could also be provided to connect the annular space 5 to the space 32 lying above the sealing element 7.

By virtue of the presence of two sealing strips 25 and 26 of almost equal length, the valve cross-section of the gas valve illustrated in FIG. 2, is almost twice as large and is about 15 to 18 mm$^2$ while having the same control times as for the first embodiment described.

Dashed lines indicate a gas distribution strip 33, into which the gas valve is inserted so as to be sealed by way of the seals 23 and in which it is fixed by a clamping plate (not illustrated) surrounding the magnetic clamping nut 2. If the clamping plate is mounted on and screwed tight, its pressure on the magnetic clamping nut 2 by way of the upper seal 23 has the effect, at the same time as fixing the valve in the gas distribution strip 33, of securing the particular position of the magnetic clamping nut 2 in terms of rotation and therefore the change of distance between the electromagnet 19 and the armature plate 12. The valve lift which has just been set is thus also reliably fixed.

Figure 3:
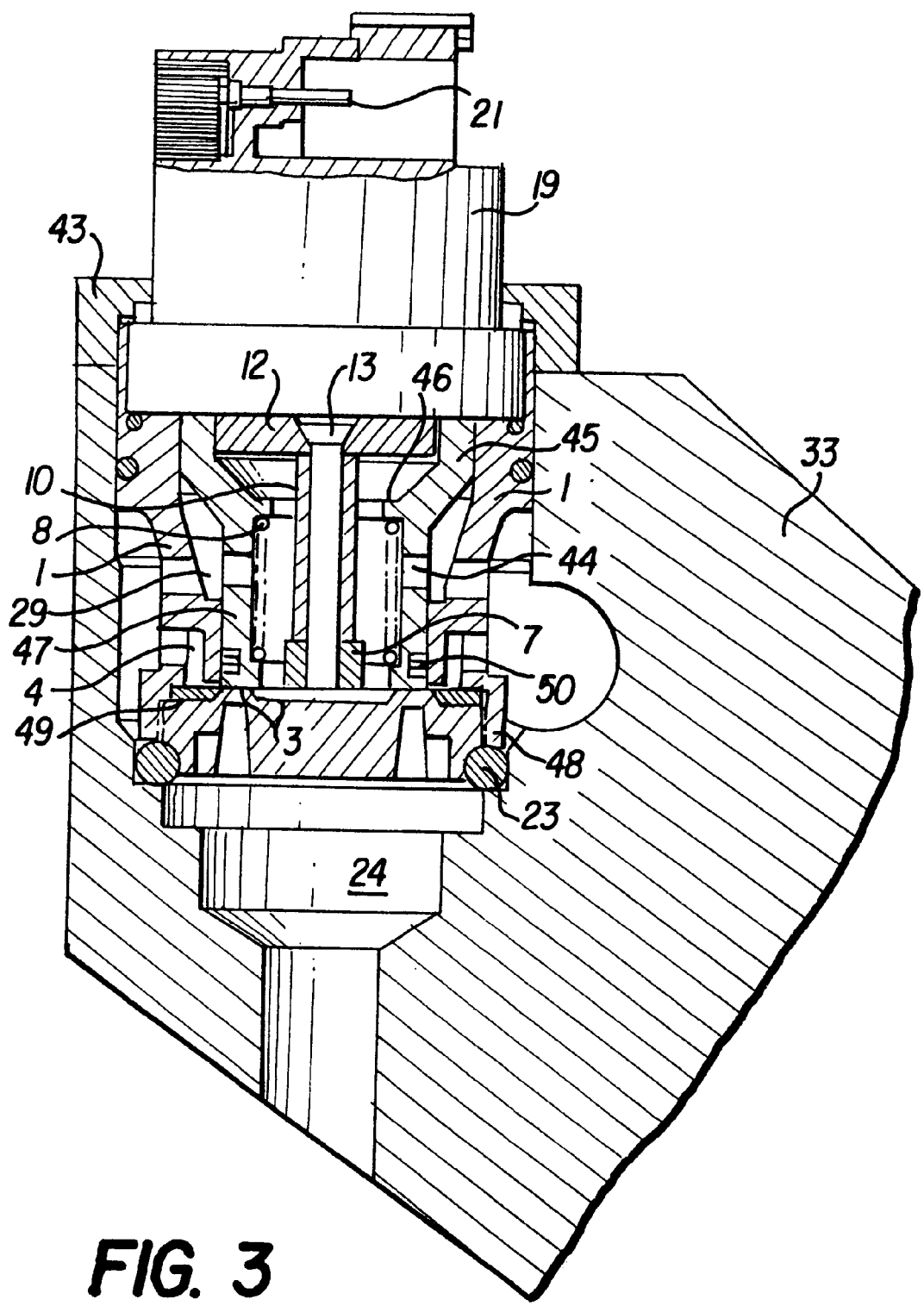
FIG. 3 shows a further embodiment of a gas valve according to the invention simplified structurally.

A somewhat simplified embodiment is illustrated in longitudinal section in FIG. 3, with components which have already been described in the previous exemplary embodiments being indicated by the same reference symbols. The gas valve in FIG. 3 is fixed by means of the clamping plate 43 in the gas distribution strip 33. The electromagnet 19 is fixed and captively held with respect to the valve housing 1 by inwardly directed offset portions of the latter. Preferably radial fuel inlets 4, 29 to the preferably concentrically circular sealing strips in the valve seat 3 which are covered by the sealing element 7, are present in the valve housing 1. Fuel passages 44 substantially aligned with the upper fuel inlets 29 are provided in an inner stop ring 45 to allow the fuel access to the innermost sealing strips. The closing spring 8 is clamped between an inner, annular projection 46 of this stop ring 45 and the sealing element 7, so that the stop ring 45 is pressed against the underside of the electromagnet 19 and the sealing element 7 is pressed onto the valve seat 3.

A preferably plane stop face 47, against which the upper side of the sealing element 7 finally comes into abutment when it is lifted off from the valve seat 3 by the electromagnet 19 through attraction of the armature plate 12 and the actuating element 10 connected to this armature plate 12 by the screwed connection 13 is formed on the lower end of the stop ring 45. The height of the stop ring 45 is advantageously dimensioned in this arrangement such that when the valve is fully open, that is to say when the sealing element 7 rests on the stop face 47, a small distance still remains between the armature plate 12 and the underside of the electromagnet 19. Damage to the relatively soft armature plate 12 and the electromagnet 19 can thus be avoided.

In order to obtain the adjustability of the lift of the sealing element 7 and thus of the opening cross-section of the valve, the valve housing 1 is designed as an adjusting element with an internal thread 48 at the lower end. This internal thread 48 engages in a corresponding external thread on the outer periphery of the valve seat 3 and permits an axial height adjustment by way of a relative rotation of these two parts with respect to one another, that is to say the valve seat 3 can be axially adjusted with respect to the underside of the electromagnet 19, which is fixed with respect to the valve housing 1. Undesired rotation and thus fixing after the distance has been adjusted is prevented by way of the stressing by means of the disc spring 49. The closing spring 8 continues to press the sealing element 7 onto the valve seat 3 and the stop ring 45 against the underside of the electromagnet 19, so that the axial adjustment of the valve housing 1 and the valve seat 3 is passed on both to the distance between the armature plate 12 fixedly connected to the sealing element 7 and to the distance between the stop face 47 and the oppositely located upper side of the sealing element 7, and in this way accordingly increases or reduces the possible lift of the sealing element 7, which is guided in the valve housing preferably by way of seals and sliding rings 50.

What is claimed is:

1. A gas valve with electromagnetic actuation comprising:
   at least one fuel inlet,
   at least one fuel outlet,
   a valve housing,
   a housing for receiving an electromagnet, the housing being constructed as a magnetic clamping nut provided with a thread and is adjustably screwed onto a thread of the valve housing,
   a sealing element, actuable by way of an armature of a controllable electromagnet and arranged between the at least one fuel inlet and the at least one fuel outlet,
   at least one closing spring acting on the sealing element, and
   wherein said magnetic clamping nut operates to adjust the distance between the electromagnet and the armature, and operates in the closed state of the valve.

2. A gas valve with electromagnetic actuation comprising:
   at least one fuel inlet,
   at least one fuel outlet,
   a valve housing, said valve housing being constructed as a clamping nut provided with a thread and being screwed onto a thread of a valve seat and said valve housing operates in the closed state of the valve,
   a housing for receiving an electromagnet,
   a sealing element, actuable by way of an armature of a controllable electromagnet and arranged between the at least one fuel inlet and the at least one fuel outlet, and
   at least one closing spring acting on the sealing element.

3. A gas valve according to claim 2, wherein a stop ring bearing against the underside of the electromagnet is arranged to be axially free in the valve housing, the closing spring being clamped between this stop ring and the sealing element.

4. A gas valve with
   electromagnetic actuation comprising:
   at least one fuel inlet,
   at least one fuel outlet,
   a housing for receiving an electromagnet,
   a valve housing,
   a sealing element, actuable by way of an armature of a controllable electromagnet and arranged between the or each fuel inlet and the or each fuel outlet, the armature is a substantially plane armature plate which is arranged, by way of an adjustable spacer element with a clearance with respect to the electromagnet, even in the open position of the valve,
   at least one closing spring acting on the sealing element, and at least one adjusting element for adjusting the distance between the electromagnet and the armature.

5. A gas valve according to claim 4, wherein the spacer element is a spacer ring which surrounds the armature plate, the spacer element is made from temperature-resistant and highly dimensionally stable material and is held in a constant position with respect to the electromagnet by way of at least one spring element.

6. A gas valve according to claim 5, wherein the spacer ring is provided on its inside with a bent-off portion, against which bears, in the open state of the valve, a projection of the armature plate or a stop plate connected thereto.

7. A gas valve according to claim 6, wherein the spacer element consists of a plastic material filled with mineral materials.

8. A gas valve according to claim 7, wherein the mineral materials are PPS, PEEK, PEI or PPA.

9. A gas valve according to claim 6, wherein the stop plate consists of precipitation-hardening chromium steel.

10. A gas valve according to claim 6, wherein the gas valve is a flat-seat valve with a plane valve seat and a sealing element with at least one plane sealing surface facing this valve seat.

11. A gas valve according to claim 5, wherein the spacer ring is provided on its inside with a bent-off portion, against which bears, in the open state of the valve, a projection of the armature plate or a stop plate connected thereto and is made from different material.

12. A gas valve according to claim 11, wherein the spacer element consists of a plastic material filled with mineral materials.

13. A gas valve according to claim 12 wherein the mineral materials are PPS, PEEK, PEI or PPA.

14. A gas valve according to claim 11, wherein the stop plate consists of precipitation-hardening chromium steel.

15. A gas valve according to claim 11, wherein the gas valve is a flat-seat valve with a plane valve seat and a sealing element with at least one plane sealing surface facing this valve seat.

\* \* \* \* \*